United States Patent

Bolon et al.

[11] Patent Number: 5,650,031
[45] Date of Patent: Jul. 22, 1997

[54] EXTRUDING THERMOPLASTIC INSULATION ON STATOR BARS

[75] Inventors: Donald Allen Bolon, Charlton; Charles Edward Baumgartner, Schenectady; Patricia Chapman Irwin, Altamont, all of N.Y.

[73] Assignee: General Electric Company, Schenectady, N.Y.

[21] Appl. No.: 533,592

[22] Filed: Sep. 25, 1995

[51] Int. Cl.$^6$ ............................................. B29C 47/02
[52] U.S. Cl. ........................... 156/244.12; 156/244.11; 264/272.2; 427/104
[58] Field of Search ................. 156/244.11, 244.12, 156/391, 392, 425; 425/97, 113, 114, 133.1, 375, 376.1, 381, 466; 427/104, 356, 358; 264/272.2; 118/404, 405

[56] References Cited

U.S. PATENT DOCUMENTS

| | | | |
|---|---|---|---|
| 1,102,965 | 7/1914 | Smith | 118/405 |
| 3,723,221 | 3/1973 | Hayashi | 156/244.12 |
| 3,940,300 | 2/1976 | Priaroggia | 425/113 |
| 4,177,756 | 12/1979 | Shigematsu | 118/404 |
| 4,182,603 | 1/1980 | Knittel . | |
| 4,247,504 | 1/1981 | Karppo | 425/133.1 |
| 4,940,504 | 7/1990 | Starnes, Jr. . | |
| 5,069,612 | 12/1991 | Teutsch et al. . | |
| 5,348,810 | 9/1994 | Page . | |
| 5,382,395 | 1/1995 | Hocake . | |
| 5,552,222 | 9/1996 | Bolon et al. . | |

FOREIGN PATENT DOCUMENTS

| | | |
|---|---|---|
| 1064622 | 4/1967 | European Pat. Off. . |
| 689925 | 12/1991 | European Pat. Off. . |
| 638408 | 2/1995 | European Pat. Off. . |
| 2629114 | 1/1978 | Germany . |
| 3831321 | 6/1989 | Germany . |

Primary Examiner—Michael W. Ball
Assistant Examiner—Richard Crispino
Attorney, Agent, or Firm—William H. Pittman

[57] ABSTRACT

An apparatus and a method provide for the extruding of thermoplastic insulation onto complex shapes, such as generator stator bars. The method of the present invention comprises the steps of feeding the complex shape through a central bore of an extrusion die to deposit a thermoplastic coating along the entire length of the shape as the extrusion die traverses the length of the complex shape.

7 Claims, 2 Drawing Sheets

EXTRUDING THERMOPLASTIC INSULATION ON STATOR BARS

BACKGROUND OF THE INVENTION

This invention relates to an apparatus and a method for applying insulation to power generator stator bars and the resulting stator bars. More particularly, it relates to an apparatus and a method for extruding thermoplastic insulation onto stator bars, an extrusion die and the stator bar comprising thermoplastic insulation that is produced by the method.

Stator bars conduct current out of the generator. Typically, a generator comprises a rotor that rotates in a magnetic field, thereby inducing an electrical field in a conductor. The stator bar is the conductor.

These stator bars typically comprise numerous strands of copper bundled together. The stator bars are manufactured in various lengths, shapes and cross sections, depending on the generator design, voltage and power. The stator bars of each generator are unique, being custom designed for the specific generator. Generators can contain more than 100 stator bars. The stator bars can be up to 30 feet long and several inches in width.

Because of the high voltage carried by these stator bars, they must be insulated electrically from the rest of the stator. Typically, high voltage insulation for generator stator bars is made by a taping process. Multiple layers of any thermosetting epoxy/mica/glass tape are wrapped around the stator bar and then covered with subsequent layers of a sacrificial polymer that protects the insulation layers during later processing. The wrapped stator bars are then heated under vacuum to remove most of the residual solvent from the epoxy resin. The epoxy resin is cured under pressure using conditions that are designed to allow the epoxy to flow sufficiently to fill any voids present in the wrapped layers. In a different process, multiple layers of mica containing tape are wrapped around the stator bar. Then, in a subsequent operation, the bar is vacuum dried to remove air and volatiles followed by pressure impregnation with an epoxy or silicone material. While providing an excellent electrical insulation when properly manufactured, these processes are very time consuming and labor intensive. Also, because of the variable processing parameters, such as time, temperature and pressure, needed to balance the proper amount of solvent release and the degree of epoxy flow prior to full cure of the epoxy resin, these systems are prone to producing an insulation that is incompletely cured or possesses residual voids.

It is desirable to have an insulation that meets the thermal, mechanical and electrical property requirements of the stator bar environment and that can be applied to the stator bar using a method that leaves it essentially free of voids. Therefore, it is desirable to use a thermoplastic material as insulation. It is also desirable to provide a method of applying insulation that is not so labor intensive, and therefore, is cheaper, while at the same time offering thermal and electrical properties that are better than those available with the process of the prior art.

Using extruded thermoplastic as insulation on wiring is well known in the art. Typically, wire is coated by an extrusion head wherein the wire is passed through a central bore within the extrusion head. This central bore is coaxial with one or more annular extrusion mandrels that deposit concentric layers of thermoplastic, such as polyethylene, onto the wire as it passes through the extrusion head. The walls of the central bore are typically parallel to the direction of movement of the wire so that the wire is held substantially straight within the extrusion head. Such an extrusion head cannot accommodate a wire that is not flexible or is not "straight" in the sense that it can be placed into the extrusion head parallel to the direction of the movement of the wire. A wire coating extrusion head is typified by the die disclosed in U.S. Pat. No. 4,940,504 wherein a plurality of layers of plastic compounds are extruded onto a moving electrical conductor which is centered in the plastic coating.

It is desirable to provide an extrusion head that can coat wires or bars which am not flexible enough to be coated through an extrusion head of the prior art. More particularly, it is desirable to provide an extrusion head that can accommodate bars of varying geometric shapes.

SUMMARY OF THE INVENTION

The present invention provides a method of extruding thermoplastic material onto a complex shape comprising the steps of:

a. feeding the complex shape with a length and more than one side into a central bore of a die wherein said central bore is of a configuration sufficient to allow said die to be moved along said complex shape, b. extruding at least one thermoplastic material through said die so that it is deposited simultaneously onto each side of said complex shape;

c. traversing said die along the entire length of said complex shape.

The present invention also provides an apparatus for applying insulation to a complex shape comprising:

a. a central bore of a die wherein said central bore is of a configuration sufficient to allow said die to be moved along a complex shape with a plurality of sides and a length, and through which said complex shape is fed, b. a means of traversing said extrusion die along the length of said complex shape, c. at least one extruder connected to said die by flexible coupling means.

The present invention further provides a die for extruding at least one thermoplastic material onto a complex shape wherein the die comprises a central bore of a shape sufficient to allow said die to be moved along the length of a complex shape.

The present invention finally provides a stator bar for power generation equipment comprising extruded thermoplastic insulation on each of a plurality of sides.

DESCRIPTION OF THE PREFERRED EMBODIMENT

This invention relates to extrusion of thermoplastic insulation onto complex shapes. More particularly, it relates to extrusion of thermoplastic insulation onto stator bars for power generators.

Figure 2:
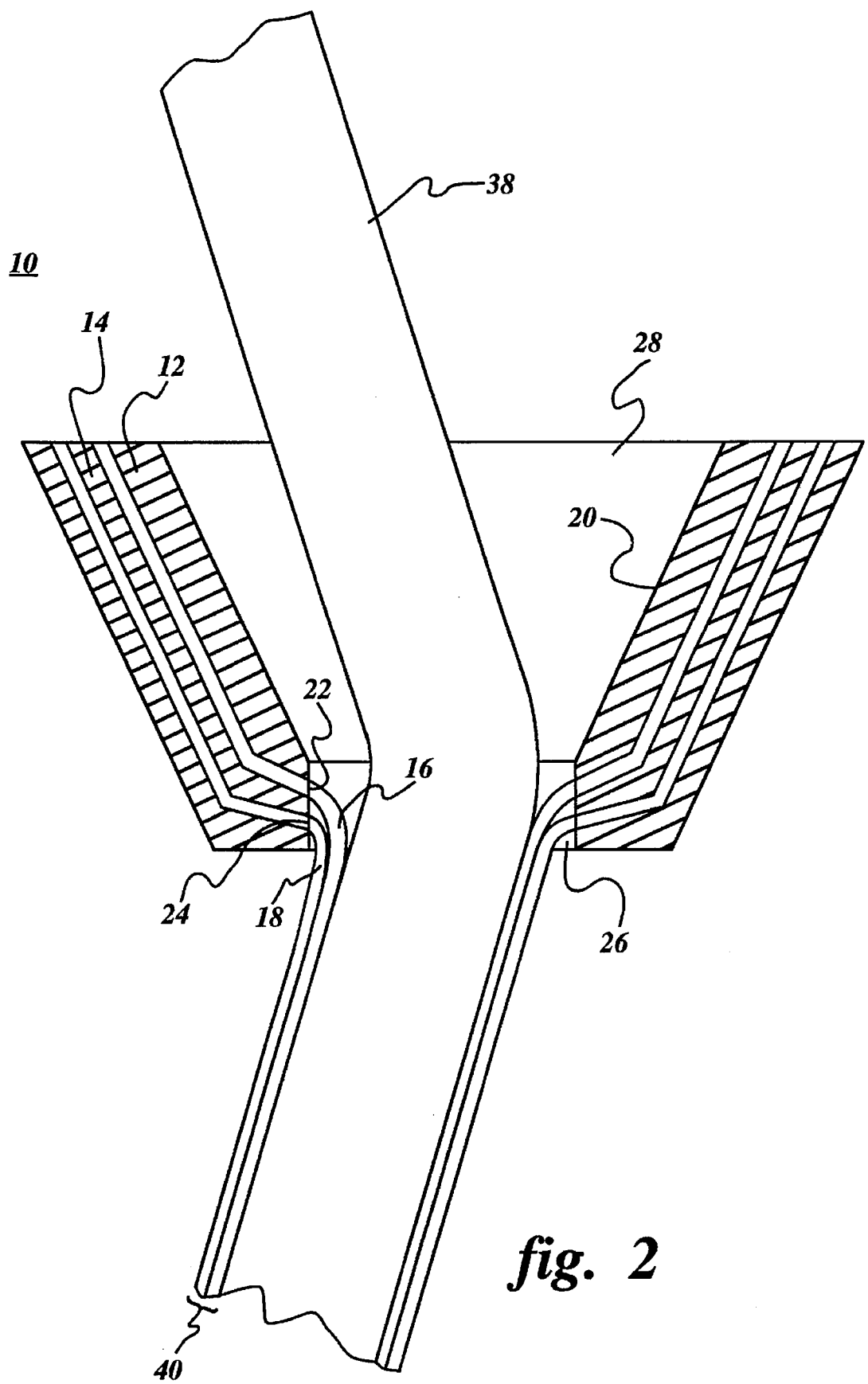
FIG. 2 is a schematic diagram of a cross section of the preferred embodiment of the die.

Extrusion dies are well known in the art. Many designs of extrusion dies used to coat wire or to extrude a parison for blow molding can be adapted for use in the present invention. As shown in FIG. 2, one embodiment of an extrusion die, indicated generally at 10, in accordance with the invention includes one or more extrusion mandrels indicated generally at 12 and 14 through which flow streams of plastic 16 and 18 onto a complex shape 38, such as a stator bar. There must be at least one extrusion mandrel 12. Additional mandrels can be added to allow for the development of a multilayer plastic coating 40 on the complex shape 38.

There is no limit on the design of the portion of the extrusion mandrels 12 and 14 that determines the flow pattern of the plastic stream(s) 16 and 18. The configuration of multiple extrusion mandrels can be similar to that disclosed in U.S. Pat. No. 4,940,504, hereby incorporated by reference, wherein the extrusion mandrels comprise concentric segments whereby the plastic streams are mechanically and thermally separated. Another acceptable extrusion mandrel design is disclosed in U.S. Pat. No. 5,069,612, hereby incorporated by reference, wherein the extrusion die 10 comprises one or more coaxial annular extrusion mandrels 12 and 14 each including a pair of mating annular members with central frustoconical portions having apexes with an axial dimension greater than the axial dimension of the outer portions of the mandrels so as to form air spaces around each mandrel including frustoconical air space portions to avoid direct heat transfer between adjacent mandrels. The extrusion die 10 design can also be similar to that disclosed in U.S. Pat. No. 4,182,603, hereby incorporated by reference, wherein the extrusion die 10 is of the type known as a spiral mandrel die wherein the extrusion mandrels 12 and 14 are provided with helical grooves on their peripheries and wherein at least one spiral mandrel has helical grooves of opposite hand than those of the remaining mandrels.

While the design of the extrusion mandrels 12 and 14 can be varied as desired, it is imperative that the extrusion mandrels 12 and 14 have a central bore 20 of a configuration sufficient to allow the complete die 10 to be moved along the length of the complex shape 38. While the central bore 20 must allow the die 10 to be moved along the complex shape 38, it must also allow the extruded plastic stream(s) 16 and 18 to contact the complex shape 38 so that the plastic adheres to the shape 38. Preferably, as shown in FIG. 2, the central bore 20 is conical with the exit(s) 22 and 24 for the plastic stream(s) 16 and 18 at the narrow end of the cone 26 and the complex shape 38 moves through the cone from the wide end 28 toward the narrow end of the cone 26. Only this narrow end of the cone 26 is in close proximity to all sides of the shape, while the wide end of the cone 28 provides space for the shape to move within the die 10 to accommodate its irregular configuration.

The narrow end of the cone 26 can be any configuration, depending on the complex shape 38 to be covered. It can be circular or oval or it can conform to the cross section of the complex shape 38 over which it traverses. The configuration of the narrow end of the cone will help to determine the thickness of the insulation. For some applications, it may be necessary to custom design a narrow end of the cone 26 that conforms substantially to the cross sectional configuration of the complex shape 38.

Figure 1:
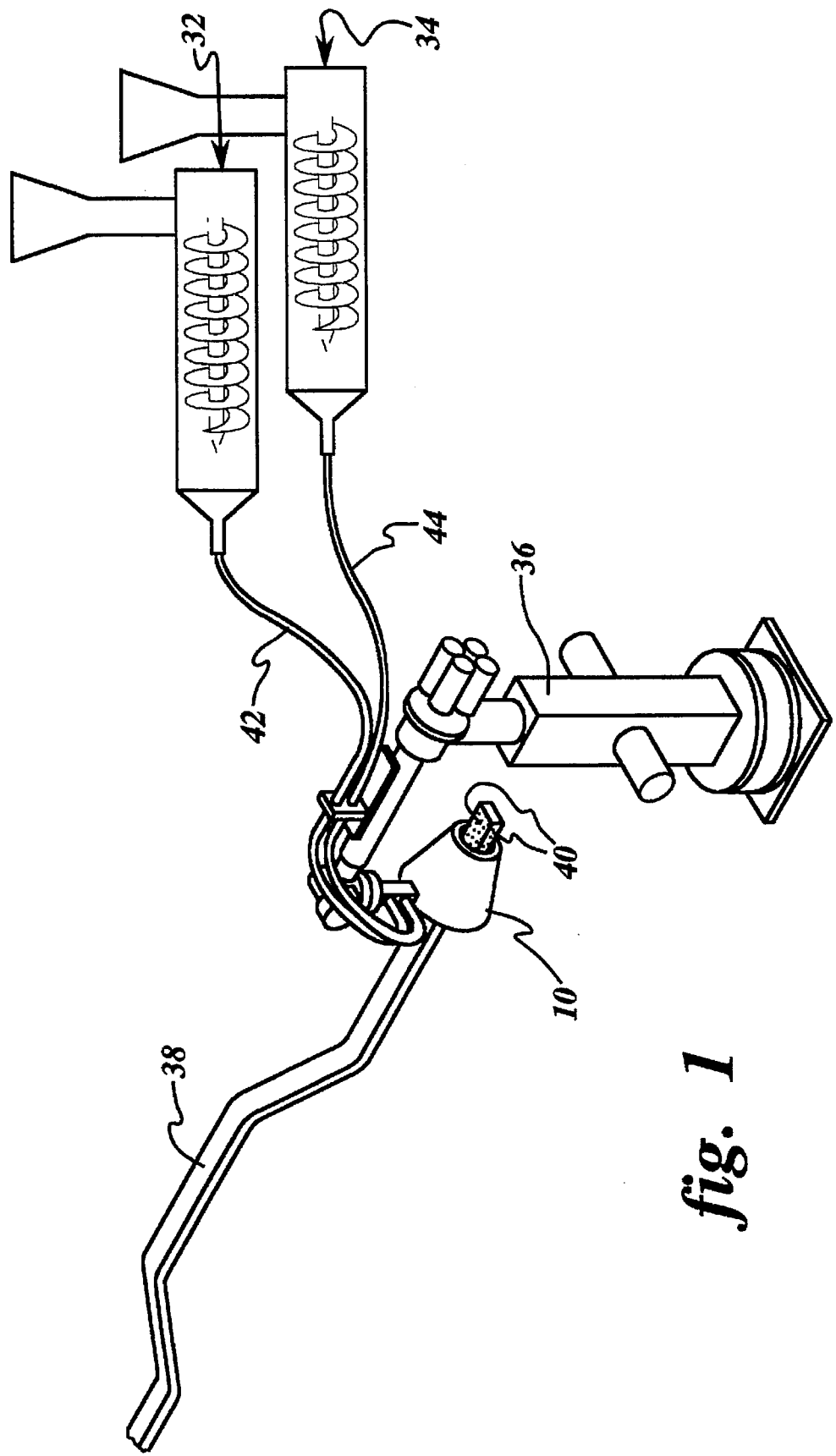
FIG. 1 is a schematic diagram of the present invention generally illustrating its major components.

The method of the present invention comprises the steps of feeding the complex shape 38 through a central bore 20 of the extrusion die 10 to deposit a thermoplastic coating 40 along the entire length of the shape 38. This method is illustrated in FIG. 1.

A complex shape 38 is fed through a central bore 20 of an extrusion die 10. There is no limit on the configuration of the complex shape 38. Preferably, the complex shape 38 comprises a stator bar of a generator. Such stator bars can comprise numerous strands of copper bundled together. They are manufactured in various lengths, shapes and cross sections, depending on the generator design, voltage and power. The stator bars can be up to 30 feet long and several inches in width and, as shown in FIG. 1, can have a non-straight length, i.e., a complex shape.

The complex shape 38 must be held by means sufficient to keep the complex shape 38 in a proper position relative to the die 10 as the die 10 traverses the length of the complex shape 38 while not interfering with the movement of the die 10 along the complex shape 38. Such means can hold the complex shape 38 stationary as the die traverses it. Means which provide for the movement of the shape 38 relative to the die 10 as the die 10 moves along the shape 38 can also be used. Such means will allow the complex shape 38 to be moved about within the central bore 20 of the die 10, thereby allowing easier passage of the die 10 along the shape 38.

The extrusion die 10 is made to traverse the length of the complex shape 38 by means sufficient to ensure that the die 10 follows the contours of the complex shape 38. Such means can include, but are not limited to, a track that follows the configuration of the complex shape 38 along which the extrusion die 10 can be propelled. Preferably, the die 10 traverses the length of the complex shape 38 by robotic means 36. These robotic means 36 can then be used with any complex shape 38 simply by being reprogrammed to propel the die 10 along the contours of a particular complex shape 38.

At least one and preferably a plurality of extruders 32 and 34 supply molten plastic resin to the extrusion die 10. The number of extruders used is dependent on the number of layers of different plastics desired to produce the thermoplastic coating 40. Extruders 32 and 34 are well known in the art. There is no limit on the type of extruder 32 and 34 that can be used. Because the extrusion die 10 must move in more than one plane to traverse the length of a complex shape, it is important that the plurality of extruders 32 and 34 be attached to the extrusion die 10 by flexible coupling means 42 and 44. Such flexible coupling means 42 and 44 must be able to withstand the temperature and pressures of the molten plastic as it leaves the extruder 32 and 34. The flexible coupling means 42 and 44 can comprise thermally heated hose. Thermally heated hose that can withstand temperatures and pressures up to 760° C. and 10 MPa is available commercially.

As depicted in FIG. 2, the plastic coating 40 that is applied to all sides of the complex shape 38 may comprise a plurality of layers made from the plurality of individual plastic streams 16 and 18 that are extruded from the plurality of die mandrels 12 and 14. The number of individual layers of thermoplastic is determinable by those skilled in the art, depending on the requirements of the particular application. For use in the present invention, the thermoplastic material must be able to withstand the temperatures at which the coated complex shape will operate. Polyetherimide is one example of one such material.

As diagrammed in FIG. 1, the apparatus for applying a thermoplastic coating to a complex shape comprises an extrusion die 10 through which a shape 38, with a plurality of sides and a length is fed, a means 36 of traversing the extrusion die 10 along the length of the complex shape 38, a plurality of extruders 32 and 34 connected to the die 10 by flexible coupling means 42 and 44.

What is claimed is:

1. A method of extruding thermoplastic material onto a rigid stator bar having a non-straight length and more then one side comprising the steps of:

(a) feeding said stator bar into a central bore of a die, said central bore being of a configuration sufficient to allow relative movement of said die over said stator bar, (b) extruding at least one thermoplastic material into said die so that it is deposited simultaneously onto each side of said stator bar, and (c) traversing said die along the entire length of said stator bar.

2. A method in accordance with claim 1, wherein said stator bar is a generator stator bar.

3. A method in accordance with claim 1, wherein said central bore is conical and comprises a narrow end a wide end and said die has at least one feed poet for at least one plastic stream at said narrow end, and said thermoplastic material is extruded through said feed port while the relative movement of said stator bar is through said central bore from the wide end toward the narrow end.

4. A method in accordance with claim 3, wherein said thermoplastic material is extruded through a plurality of feed ports.

5. A method in accordance with claim 1, further comprising supporting said stator bar by means sufficient to hold said stator bar stationary as said die traverses it.

6. A method in accordance with claim 1, further comprising supporting said stator bar by means which provide for the movement of said stator bar relative to said die as said die moves along said stator bar.

7. A method in accordance with claim 1, wherein said die traverses the length of said stator bar by robotic means.

* * * * *